United States Patent
Amon et al.

(10) Patent No.: US 9,872,032 B2
(45) Date of Patent: Jan. 16, 2018

(54) AUTOGRESSIVE PIXEL PREDICTION IN THE NEIGHBORHOOD OF IMAGE BORDERS

(71) Applicant: SIEMENS AKTIENGESELLSCHAFT, München (DE)

(72) Inventors: Peter Amon, München (DE); Andreas Hutter, München (DE); André Kaup, Effeltrich (DE); Johannes Rehm, Berching-Holnstein (DE); Andreas Weinlich, Windsbach (DE)

(73) Assignee: Siemens Aktiengesellschaft, München (DE)

( * ) Notice: Subject to any disclaimer, the term of this patent is extended or adjusted under 35 U.S.C. 154(b) by 223 days.

(21) Appl. No.: 14/763,082

(22) PCT Filed: Dec. 19, 2013

(86) PCT No.: PCT/EP2013/077277
§ 371 (c)(1),
(2) Date: Jul. 23, 2015

(87) PCT Pub. No.: WO2014/114413
PCT Pub. Date: Jul. 31, 2014

(65) Prior Publication Data
US 2015/0365682 A1 Dec. 17, 2015

(30) Foreign Application Priority Data
Jan. 23, 2013 (EP) .................................. 13152388

(51) Int. Cl.
*H04N 7/12* (2006.01)
*H04N 19/182* (2014.01)
(Continued)

(52) U.S. Cl.
CPC ........... *H04N 19/182* (2014.11); *H04N 19/11* (2014.11); *H04N 19/136* (2014.11);
(Continued)

(58) Field of Classification Search
CPC .................................................. H04N 19/182
See application file for complete search history.

(56) References Cited

U.S. PATENT DOCUMENTS

| 2007/0002060 A1 | 1/2007 | King |
| 2007/0160133 A1 | 7/2007 | Bao et al. |

(Continued)

FOREIGN PATENT DOCUMENTS

| CN | 101366283 A | 2/2009 |
| CN | 101385346 A | 3/2009 |

(Continued)

OTHER PUBLICATIONS

European Search Report for related European application No. 13152388.8, dated Aug. 8, 2013.
(Continued)

*Primary Examiner* — Young Lee
(74) *Attorney, Agent, or Firm* — Lempia Summerfield Katz LLC

(57) ABSTRACT

For each array of pixels, an autoregressive pixel-prediction method is performed based on a weighted sum of reconstructed pixel values of reconstructed pixels in a specific neighborhood region adjacent to the current pixel to be coded. For determining the weights, the pixel values in a specific training region adjacent to the current pixel are taken into account. The coding method is characterized by an appropriate determination of the specific neighborhood region and the specific training region in case that reconstructed pixel values do not exist for all pixels in the neighborhood region and the training region. In such a case, the number of pixels in the neighborhood region is reduced to a number of reconstructed pixels until the ratio between (Continued)

the number of pixels in the training region and the number of pixels in the neighborhood region exceeds a predetermined threshold.

23 Claims, 6 Drawing Sheets

(51) Int. Cl.
   H04N 19/593 (2014.01)
   H04N 19/11 (2014.01)
   H04N 19/90 (2014.01)
   H04N 19/136 (2014.01)
   H04N 19/169 (2014.01)
   H04N 19/44 (2014.01)
   H04N 19/70 (2014.01)
   H04N 19/91 (2014.01)

(52) U.S. Cl.
   CPC .......... *H04N 19/169* (2014.11); *H04N 19/44* (2014.11); *H04N 19/593* (2014.11); *H04N 19/70* (2014.11); *H04N 19/90* (2014.11); *H04N 19/91* (2014.11)

(56) References Cited

U.S. PATENT DOCUMENTS

2010/0232506 A1   9/2010   Yin et al.
2012/0281930 A1   11/2012  Darouich et al.

FOREIGN PATENT DOCUMENTS

CN    101977323 A       2/2011
WO    WO2011023502 A1   3/2011

OTHER PUBLICATIONS

M. J. Weinberger, G. Seroussi, and G. Sapiro, "The LOCO-I lossless image compression algorithm: principles and standardization into JPEG-LS," IEEE transactions on image processing, vol. 9, No. 8, pp. 1309-1324, Jan. 2000.

PCT International Search Report and Written Opinion of the International Searching Authority dated Feb. 28, 2015 for corresponding PCT/EP2013/077277.

S. Marusic and G. Deng, "Adaptive prediction for lossless image compression," Signal Processing: Image Communication, vol. 17, No. 5, pp. 363-372, May 2002.

Wu et al; "Adaptive Sequential Prediction of Multidimensional Signals With Applications to Lossless Image Coding," IEEE Transactions on Image Processing, vol. 20, No. 1, pp. 36-42, ISSN: 1057-7149, DOI: 10.1109/ TIP.2010.2061860, XP011328692, Jan. 1, 2011.

X. Li and M. T. Orchard, "Edge-directed prediction for lossless compression of natural images," IEEE Transac-tions on Image Processing, vol. 10, No. 6, pp. 813-817, 2001.

X. Wu, E. U. Barthel, and W. Zhang, "Piecewise 2D autorgression for predictive image coding," in 1998 International Conference on Image Processing, ICIP 98. Proceedings, vol. 3, pp. 901-904, 1998.

Chinese Office Action for Chinese Patent Application No. 201380071242.3 dated Jul. 3, 2017.

FIG 5  ZS
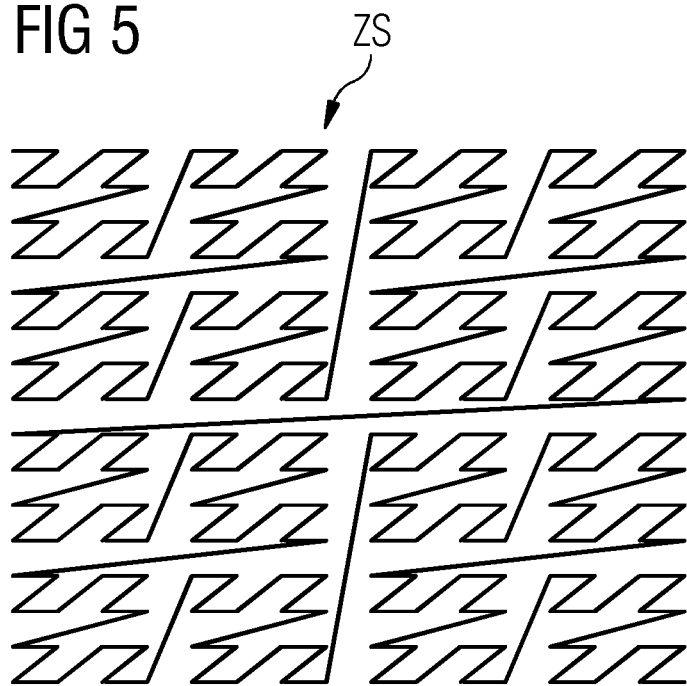
FIG 6  HS
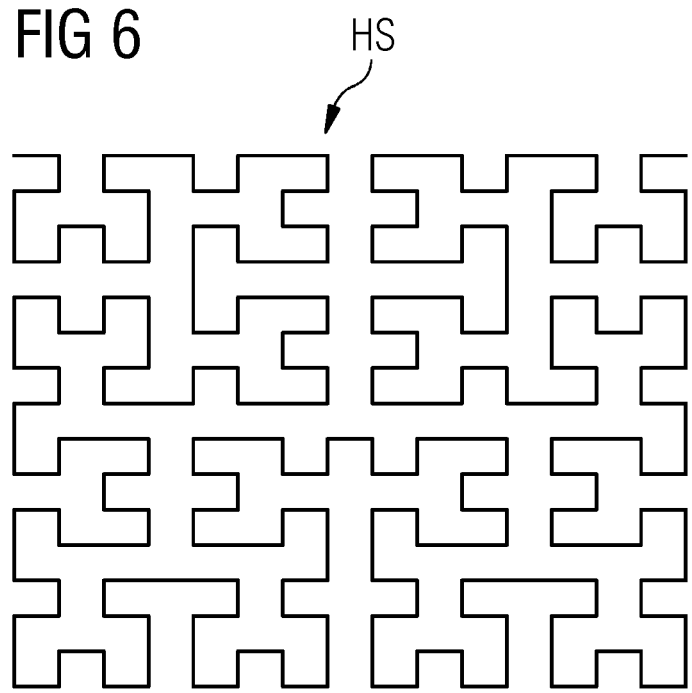

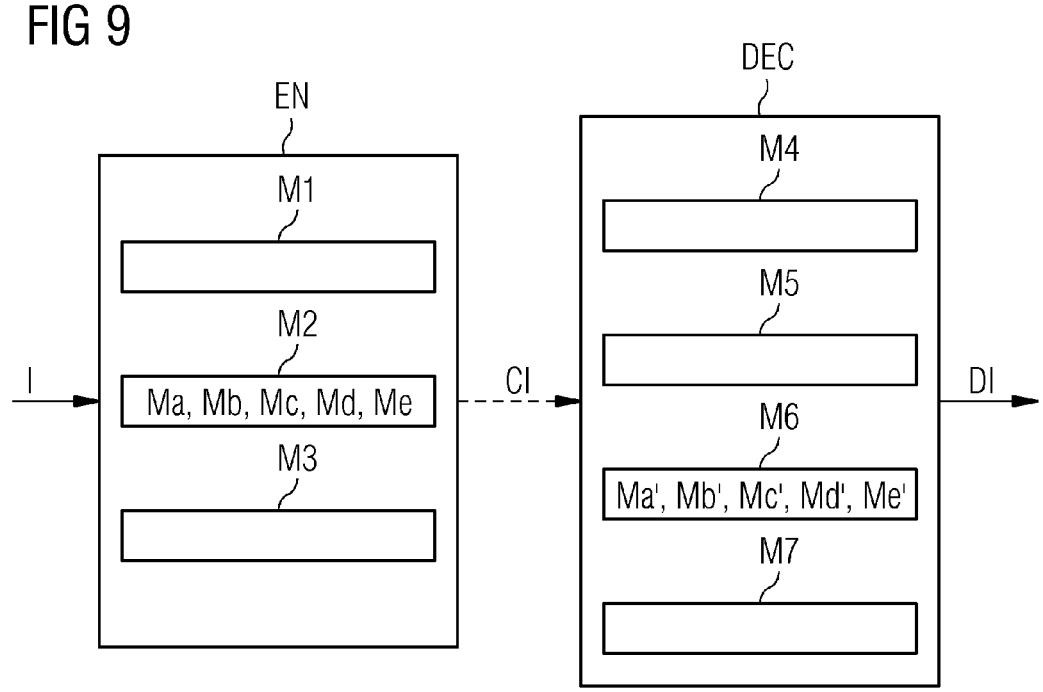

AUTOGRESSIVE PIXEL PREDICTION IN THE NEIGHBORHOOD OF IMAGE BORDERS

The present patent document is a §371 nationalization of PCT Application Serial Number PCT/EP2013/077277, filed Dec. 19, 2013, designating the United States, which claims the benefit of EP 13152388.8, filed Jan. 23, 2013. The entire contents of these documents are hereby incorporated herein by reference.

BACKGROUND

The present embodiments relate to coding digital image data and a corresponding decoding.

Increasing resolution and quality requirements on visual content, like images, videos, or multi-dimensional medical data raise the demand for highly efficient coding methods. In predictive coding techniques, the pixel values of pixels in the image data are predicted. The difference between the predicted pixel values and the original pixel values (e.g., the prediction error) is compressed, thus forming a part of the coded image data.

Different variants of piecewise autoregressive pixel-prediction methods are provided. In those methods, a pixel value of a current pixel to be predicted is calculated based on a weighted sum of reconstructed, previously processed pixels in a neighborhood region adjacent to the current pixel. In order to determine the weights, a system of linear equations based on the weighted sums for known pixel values in a training region adjacent to the current pixel is solved.

For a precise prediction, piecewise autoregressive pixel-prediction methods use a large causal neighborhood region of known reconstructed pixels around the current pixel. Usually, such a large neighborhood region is not available for all image positions (e.g., at image borders). This problem becomes worse if image regions are to be coded independently from each other, as is the case for a block-wise processing in parallel coding implementations.

The above described border problem occurring in piecewise autoregressive pixel-prediction methods is often not addressed in prior art publications, or border regions are skipped when using autoregressive pixel-prediction methods. A direct way to address this problem without an algorithmic change is an image padding at border regions (e.g., with known values of already transmitted border pixel values; constant border extension). A reduction of the training region size at border positions may be provided. However, this leads to an over-fitting and often causes badly conditioned systems of linear equations. Another option for handling border regions is a special border pixel treatment using different prediction schemes with relaxed context requirements like median prediction. Such special treatment requires additional implementation effort, leads to inhomogeneous predictions, and may often considerably jeopardize prediction accuracy.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method for coding digital image data including a piecewise autoregressive pixel-prediction method overcoming the above disadvantages and enabling an efficient compression with low complexity is provided. As another example, a corresponding decoding method as well as an apparatus for coding and an apparatus for decoding are provided.

According to the method, digital image data including one or more arrays of pixels (e.g., 2-D, 3-D, or even N-dimensional data) with corresponding pixel values is coded. Pixel values of the pixels to be coded in each array are predicted by a prediction in which the predicted value of a current pixel is determined based on a weighted sum of reconstructed pixel values of reconstructed, previously processed pixels in a specific neighborhood region adjacent to the current pixel. The reconstructed pixel values refer to pixel values having been compressed and decompressed in the method before or even to the original pixel values in case that a lossless coding method is used. The weights of the weighted sum of reconstructed pixel values are determined based on linear and/or non-linear equations for reconstructed pixels in a specific training region adjacent to the current pixel where the training region has at least the size of the neighborhood region and, for example, includes the pixels of the neighborhood region. The method described refers to a piecewise autoregressive prediction method. The prediction error between predicted pixel values and the original pixel values is processed in the coding method for generating the coded image data as known from the prior art. The above term "linear and/or non-linear equations" refers to equations that are linear and/or non-linear with respect to the weights as variables.

The method is based on a new technique for determining the specific neighborhood region and the specific training region used in the prediction method. The regions are determined as described in the following.

In act a), the pixels in a preset neighborhood region adjacent to the current pixel for which reconstructed pixel values in the array exist are determined, resulting in a modified neighborhood region defined by the determined pixels. In act b), the pixels in a preset training region adjacent to the current pixel for which reconstructed pixel values in the array exist and for which the modified neighborhood region adjacent to the respective pixel exclusively includes pixels for which reconstructed pixel values in the array exist are determined, resulting in a modified training region defined by the determined pixels.

In act c), a validation value being dependent on a parameter (e.g., being the parameter) that increases in dependency on an increasing number of pixels in the modified training region (e.g., with the number of pixels in the modified neighborhood region being fixed) and increases in dependency on a decreasing number of pixels in the modified neighborhood region (e.g., with the number of pixels in the modified training region being fixed) is determined. In one embodiment, the validation value is increasing or decreasing in dependency on an increasing parameter. In one embodiment, the parameter and, for example, the validation value is the ratio between the number of pixels in the modified training region and the number of pixels in the modified neighborhood region.

In act d) of the method according to one or more of the present embodiments, an iteration is performed if the validation value corresponds to a parameter that is less than or less than or equal to a predetermined threshold value. In case that this condition for the validation value is not fulfilled, the specific neighborhood region corresponds to the modified neighborhood region and the specific training region corresponds to the modified training region.

In case that the iteration is performed, the method proceeds with act e), where at least one additional pixel is removed in each iteration step from the modified neighborhood region, resulting in an updated modified neighborhood region in each iteration step. The iteration terminates when the validation value determined in the corresponding iteration step based on the number of pixels in the updated modified neighborhood region (e.g., based on the ratio of the number of pixels in the (updated) modified training region and the number of pixels in the updated modified neighborhood region) corresponds to a parameter that exceeds or reaches the predetermined threshold value. In case of a termination of the iteration, the specific neighborhood region is the updated modified neighborhood region and the specific training region is a region exclusively including pixels of the preset training region for which reconstructed pixel values exist and for which the updated modified neighborhood region at the termination of the iteration exclusively includes pixels for which reconstructed pixel values exist.

The method of one or more of the present embodiments is based on the finding that a low ratio between the number of pixels in the training region and the number of pixels in the neighborhood region leads to an inaccurate prediction due to an inaccurate determination of the weights based on the system of linear and/or non-linear equations. Hence, in such a case, the ratio is increased by pruning pixels in the neighborhood region until a predetermined threshold value is reached. In one embodiment, the predetermined threshold value is chosen to be at least 1.5. In one embodiment, the threshold value is chosen to be about five, leading to very good predictions.

In one variant, the above described specific training region determined in act e) is the modified training region. However, this region may also be an updated modified training region exclusively including all pixels of the preset training region for which reconstructed pixel values exist and for which the updated modified neighborhood region at the termination of the iteration exclusively includes pixels for which reconstructed pixel values exist. In the latter case, a more precise determination of the weights is achieved because the updated modified training region may include more pixels than the modified training region due to the reduced number of pixels in the neighborhood region.

In one embodiment, the validation value in act e) is determined based on both the number of pixels in the updated modified neighborhood region and the number of pixels in the above defined updated modified training region. For example, the validation value is determined based on the ratio between the number of pixels in the updated modified training region and the number of pixels in the updated modified neighborhood region. This results in a very good measure for the accuracy of the prediction.

In another embodiment, the at least one pixel being removed in each iteration step is the pixel that results in an updated modified neighborhood region leading to an updated modified training region with the most pixels. This embodiment provides a good adaptation of the training region leading to a large validation value and, thus, a good accuracy of the prediction.

In another variant, a Euclidean distance is defined in each array of pixels, where the at least one pixel being removed in each iteration step is the pixel with the largest Euclidian distance to the current pixel. Analogously to the embodiment described before, this leads to a good accuracy of the prediction.

In case that there are several pixels leading to an updated modified training region with the most pixels and/or if there are several pixels with the largest Euclidean distance, the pixel out of those several pixels is removed, resulting in an updated modified neighborhood region having a centroid with the smallest distance to the current pixel. This results in a removal of pixels in the neighborhood region where many other pixels are present, leading to good prediction results.

In another variant, another type of prediction than the above-described piecewise autoregressive pixel-prediction is used for specific current pixels based on one or more criteria (e.g., in case that the iteration cannot find an updated modified neighborhood region leading to a validation value that corresponds to a parameter that exceeds or reaches the predetermined value). An example of another type of prediction is a prediction based on the mean of the available pixels in the neighborhood region or a direct copy of the nearest pixel to the current pixel.

In another variant, the pixels of the digital image data are coded in a coding order based on a line-scan and/or a Z-order scan and/or a Hilbert scan.

In one embodiment, the prediction error determined in the coding method is subjected to an entropy coding. Optionally, the prediction error may be subjected to a lossy compression method before applying entropy coding. If the prediction error is only entropy encoded, this leads to a lossless coding scheme. In one embodiment, the entropy coding for each array of pixels is an adaptive arithmetic coding or an adaptive variable length coding that may start with an initial probability distribution having one or more distribution parameters and, for example, a variance. For example, the probability distribution is a Laplacian or Gaussian probability distribution. The distribution parameters are included as a side information in the coded image data and, thus, enable the proper decoding of the coded image data.

In another embodiment, several (e.g., all) arrays of pixels are coded simultaneously, enabling a parallel processing of several arrays, resulting in a fast coding of the image data.

In a variant, the above described acts a) to e) are performed before performing the prediction of pixel values, where the specific neighborhood regions and specific training regions for the pixels are prestored in a storage that is accessed during prediction of the pixel values. Hence, the determination of the neighborhood and training regions may be performed before the actual coding of the image data leading to a fast prediction and, thus, a fast coding of the image data.

In a variant, the coding method is a video coding method that codes a sequence of digital images, where each array of pixels refers to a block in the sequence. The term block is to be interpreted broadly and may also include the whole image. For example, the video coding may be based on the standard H.264/AVC or the (draft) standard High Efficiency Video Coding (HEVC).

The method of one or more of the present embodiments may also be used for coding image data including one or more images having three or more dimensions (e.g., medical volume images determined by a computed tomography system). In such a case, the above mentioned blocks refer to N-dimensional cuboids that are cubes in case of three dimensions.

Besides the above coding method, the present embodiments also refer to a method for decoding digital image data that is coded by the above described coding method. In such a decoding method, the prediction errors are reconstructed from the coded image data. The image data includes one or more arrays of pixels with corresponding pixel values, where pixel values of the pixels to be decoded in each array are predicted by a prediction in which the predicted value of a current pixel is determined based on a weighted sum of reconstructed pixel values of reconstructed, previously decoded pixels in a specific neighborhood region adjacent to the current pixel. The weights of the weighted sum are determined based on linear and/or non-linear equations for reconstructed pixels in a specific training region adjacent to the current pixel, where the predicted pixel value is corrected by the reconstructed prediction error, resulting in a decoded pixel value for the current pixel. The decoding method is characterized in that the specific neighborhood region and the specific training region for the current pixel are determined based in the same way as during coding (e.g., based on the above described acts a) to e)).

In one embodiment of the decoding method, several arrays of pixels that have been coded simultaneously are to be decoded. In such a case, the above defined one or more distribution parameters of the probability distribution may be used for determining the start of a corresponding array of pixels.

One or more of the present embodiments also refer to a method for coding and decoding digital image data, where the digital image data is coded by the above described coding method and the coded digital image data is decoded by the above described decoding method.

One or more of the present embodiments also refer to a coding apparatus for digital image data including one or more arrays of pixels with corresponding pixel values, where the apparatus includes a predictor for predicting the pixel values of the pixels to be coded in each array by a prediction in which the predicted value of a current pixel is determined based on a weighted sum of reconstructed pixel values of reconstructed, previously processed pixels in a specific neighborhood region adjacent to the current pixel. The weights of the weighted sum are determined based on linear and/or non-linear equations for reconstructed pixels in a specific training region adjacent to the current pixel, where the apparatus includes a processor in which a prediction error between predicted pixel values and the original pixel values is processed for generating the coded image data.

The apparatus of one or more of the present embodiments is characterized by a device for determining the specific neighborhood region and the specific training region for the current pixel. The device includes, for each of the above described acts a) to e), a way (e.g., a device) to perform the corresponding one of acts a) to e).

The coding apparatus may include one or more additional devices for performing one or more embodiments of the coding method.

One or more of the present embodiments also refer to an apparatus for decoding digital image data that is coded by the above described coding method. The apparatus includes a reconstructor for reconstructing the prediction errors from the coded image data. The image data includes one or more arrays of pixels with corresponding pixel values, where the apparatus includes a predictor for predicting the pixel values of the pixels to be decoded in each array by a prediction in which the predicted value of a current pixel is determined based on a weighted sum of reconstructed pixel values of reconstructed, previously decoded pixels in a specific neighborhood region adjacent to the current pixel. The weights of the weighted sum are determined based on linear and/or non-linear equations for reconstructed pixels in a specific training region adjacent to the current pixel. The apparatus includes a corrector for correcting the predicted pixel value by the reconstructed prediction error, resulting in a decoded pixel value for the current pixel.

The decoding apparatus further includes a determiner for determining the specific neighborhood region and the specific training region of the current pixel. The determiner includes, for each of the above described acts a) to e), a way (e.g., a device) to perform the corresponding one of acts a) to e).

One or more of the present embodiments also refer to a codec for coding and decoding digital image data, including a coding apparatus according to an embodiment and a decoding apparatus according to an embodiment.

BRIEF DESCRIPTION OF THE DRAWINGS

FIG. 5 and FIG. 6 show coding scan directions that may be used in embodiments;

FIG. 9 is a schematic illustration of a coding and decoding apparatus according to an embodiment.

DETAILED DESCRIPTION

In the following, an embodiment of a method according to the present embodiments will be described with respect to the coding of images within a video including a time sequence of images. The method is based on intra coding where the values of pixels are predicted by pixels in the same image. The method uses a piecewise autoregressive pixel-prediction known from the prior art. However, the determination of corresponding neighborhood regions and training regions, as described below, is not known from the prior art.

Figure 1:
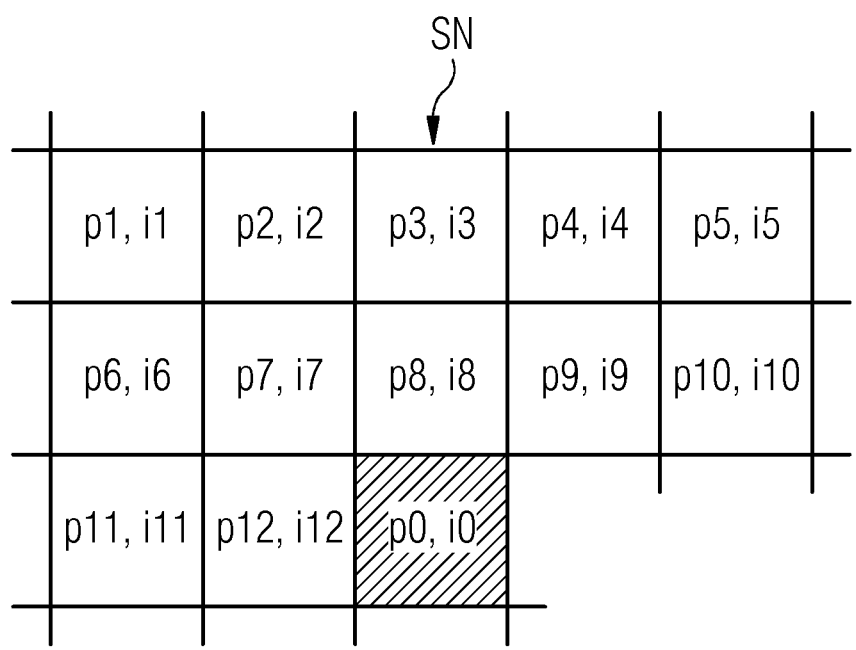
FIG. 1 and FIG. 2 show a neighborhood region and a training region of a piecewise autoregressive pixel-prediction method that may be used in an embodiment.
Figure 2:
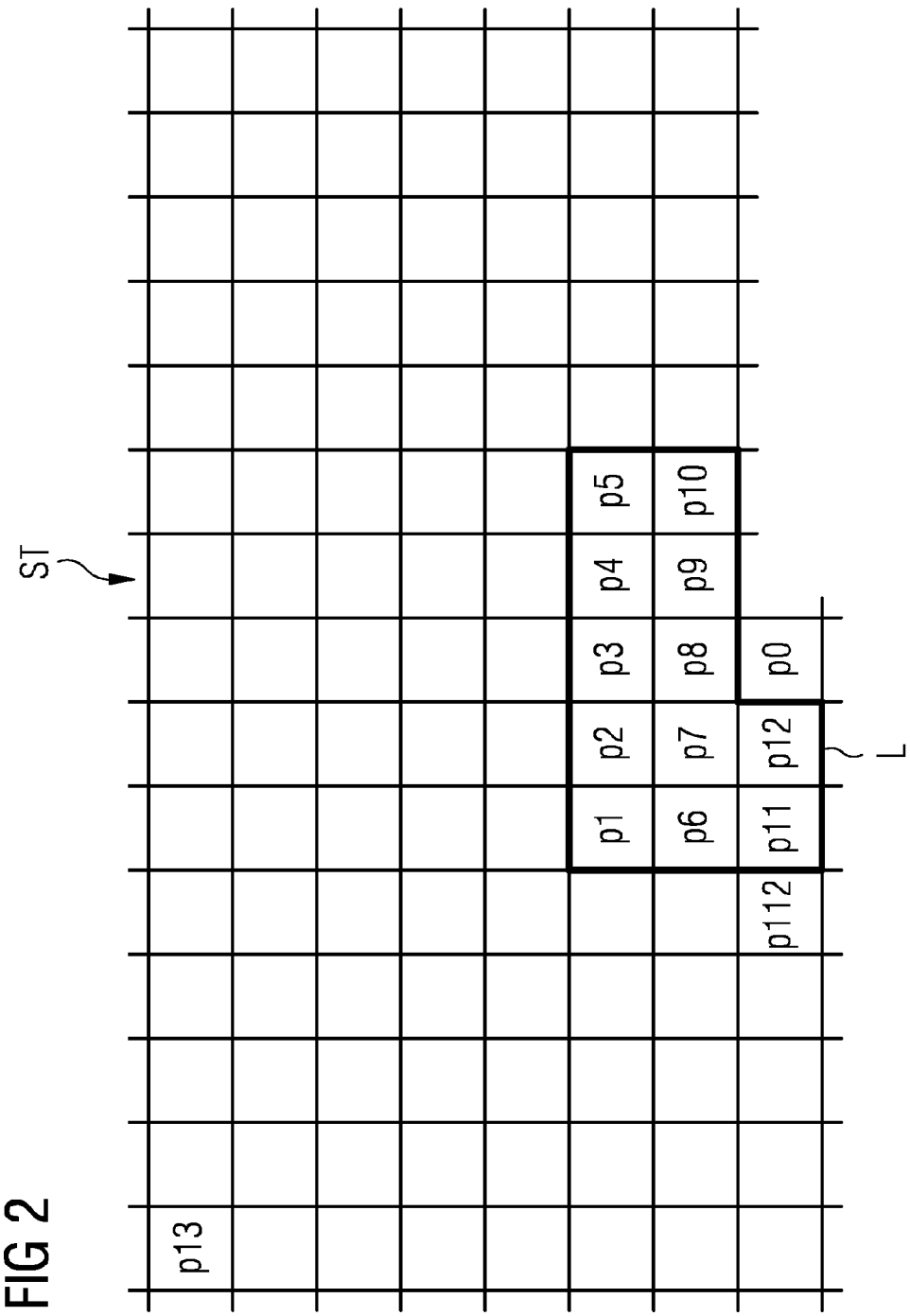

FIG. 1 and FIG. 2 illustrate neighborhood and training regions of a piecewise autoregressive pixel-prediction method that may be used in the method. In the scenario of FIG. 1, a section of an image including pixels p0, p1, . . . , p12 (e.g., corresponding two-dimensional pixel position in the image) is shown. Each pixel has a corresponding pixel value in the form of an intensity i0, i1, i2, etc. According to FIG. 1, the pixels are coded in a line-scan order where the image is traversed line by line beginning with the uppermost line in the image. For each pixel in the image, a prediction value based on reconstructed pixel values of pixels that have been reconstructed from the coded pixels is determined. In case of a lossless coding, such a reconstructed pixel value corresponds to the original pixel value. After having determined the predicted value of the corresponding pixel, the prediction error between the predicted value and the original value of the pixel is subjected to further coding and thereafter transmitted to a decoder. Depending on the type of coding, only an entropy coding may be applied to the prediction error in case of a lossless coding. In case of a lossy coding, the prediction error may be subjected to a transform and/or quantization. In such a case, the reconstructed pixel value is derived by applying an inverse quantization and an inverse transform to the prediction error, and this reconstructed prediction error may be added to the corresponding predicted pixel value. In the decoder, the same prediction as for the encoder is used where the prediction error reconstructed in the decoder is added to the predicted pixel value resulting in a decoded pixel value of the corresponding pixel.

Based on FIG. 1 and FIG. 2, the pixel value of a current pixel is determined based on a number of pixels in the neighborhood of this pixel. According to FIG. 1, the pixel value i0 of pixel p0 is to be predicted. To do so, the specific neighborhood region SN of already reconstructed pixels p1 to p12 is taken into account. This neighborhood region is the same for each pixel to be predicted and may be regarded as a template for prediction. According to FIG. 1, these are all pixels with a maximum Manhattan distance of two pixels form the neighborhood region. For calculating the predicted value i0, the following formula is used:

$$i0 = w1 \times i1 + w2 \times i2 + w3 \times i3 + w4 \times i4 + w5 \times i5 + w6 \times i6 + w7 \times i7 + w8 \times i8 + w9 \times i9 + w10 \times i10 + w11 \times i11 + w12 \times i12.$$

The terms w1, w2, . . . , w12 are weights that are adaptive, which provides that the weights are adapted for each pixel to be predicted depending on a larger neighborhood of pixel values (e.g., training region or training window). Such a specific training region ST is shown in FIG. 2. The training region includes pixels p1 to p12 of the neighborhood region SN, where the neighborhood region SN is indicated by the border L. One Hundred other pixels indicated as squares outside the neighborhood region are part of the training region ST. For the sake of clarity, only pixels p13 and p112 of the training region outside the neighborhood region are designated by those reference numerals. For each pixel within the training region, the above prediction formula is used, except that the true value of these pixels is already known because the training region includes reconstructed pixels with reconstructed pixel values. However, the weights are unknown in these prediction formulas so that a system of 112 linear equations including the weights as unknown variables is formed. This system of equations is solved by known least-squares based methods (e.g., by using the Moore-Penrose pseudo-inverse). It is evident for a skilled person that the weights may also be determined based on non-linear equations (e.g., equations including squared weights).

The above described prediction method works well for pixels that are not at the border of the corresponding image or image block. For pixels at borders, the neighborhood region and the training region may extend beyond the borders and, thus, may not have a reconstructed pixel value for each pixel in the corresponding region. According to the prior art, a special treatment for such cases based on a border extension or a reduction of the training region size that requires additional implementation effort or leads to inhomogeneous predictions are used. Contrary to that, one or more of the present embodiments provide an easy and straightforward method for defining neighborhood regions and training regions leading to a good prediction of the corresponding pixels. The method for defining corresponding neighborhood regions and training regions is explained in the following with respect to the flowchart of FIG. 3.

The method starts with a preset neighborhood region PN and a preset training region PT based on corresponding templates (e.g., starting point S1). These regions may be the same as the neighborhood region and training region shown in FIG. 1 and FIG. 2. As mentioned above, possible positions in the neighborhood region and the training region may be restricted (e.g., at image or block borders). In one embodiment, a method to reduce the size of the preset neighborhood region and the preset training region is provided. The preset neighborhood region PN is pruned if the preset neighborhood contains pixels where the pixel values or intensities are unknown. In other words, a modified neighborhood region MN only including pixels with reconstructed pixel values is derived from the preset neighborhood region PN. All possible pixel positions in the preset training region PT are skipped where either the pixel value at this position is unknown or the pixel value at one of its own neighborhood positions based on the modified neighborhood region MN is unknown. This results in a modified training region MT (act S2). No padding or extrapolation operations like constant border extension need to be performed, which would impair the training or prediction performance since such data is not really known but rather only derived from observed data.

As explained above, act S2 results in a modified neighborhood region MN and a modified training region MT. Hereinafter, the number of pixels or positions in the modified neighborhood region is designated as n and the number of pixels or positions in the modified training region is designated as m. The number of training pixels and thus the number of linear equations m for a fixed number n of unknown weights becomes too small, increasing the probability of ill-conditioned systems of equations. This often leads to a set of inaccurate weights causing imprecise predictions (e.g., high prediction errors) that may be caused by image noise, for example. In order to overcome those disadvantages, further positions from the modified neighborhood MN region and the modified training region MT are pruned in a pixel-by-pixel fashion and in an order of decreasing Euclidian distances, as is described below.

Figure 3:
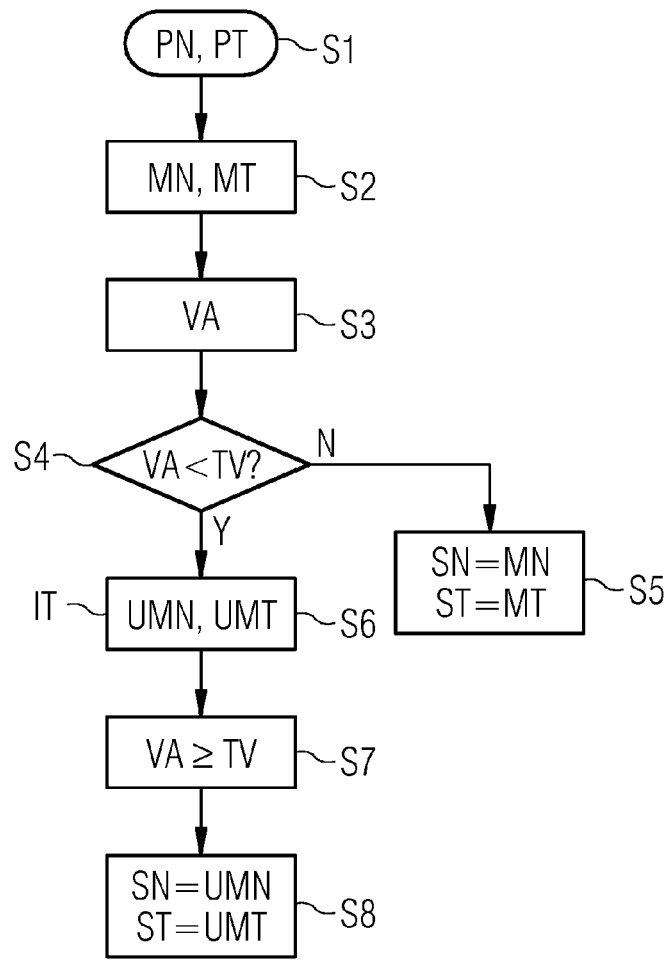
FIG. 3 shows a flow chart illustrating the acts performed in one embodiment of a method to determine a neighborhood region and a training region.

In act S3 of the method of FIG. 3, a validation value VA that represents the ratio of the values m and n is calculated. If the validation value VA is smaller than a predefined threshold value (branch Y out of act S4), the above mentioned pruning will take place because a low validation value has a high probability of an ill-conditioned system of equations. In case that the validation value VA is greater than or equal to the threshold value TV (branch N out of act S4), the specific neighborhood region and the specific training region used in the prediction are set to the modified neighborhood region MN and the modified training region MT, as indicated in act S5.

In the pruning process, an iteration IT will take place in act S6. In each iteration step of this iteration, a pixel in the modified neighborhood region MN having the largest Euclidian distance to the current pixel p0 is discarded. This results in an updated modified neighborhood region UMN in each iteration step. For such an updated modified neighborhood region, an updated modified training region UMT is calculated. This updated modified training region exclusively includes all pixels of the preset training region PT for which reconstructed pixel values exist and for which the updated modified neighborhood region adjacent to the corresponding pixel exclusively includes pixels for which reconstructed pixel values exist.

After each iteration step, the above described validation value VA is calculated based on the number of pixels of the updated modified neighborhood region and the updated modified training region. In other words, the ratio between the number of pixels of the training region UMT and the number of pixels of the neighborhood region UMN is determined. The iteration is continued in case that the value VA is smaller than the threshold value TV. In other words, in a next iteration step, another pixel in the new updated modified neighborhood region having the largest Euclidian distance to the pixel to be predicted is discarded.

In case that the validation value VA reaches or exceeds the threshold value TV (act S7), the iteration terminates because it may be assumed that a precise prediction may be achieved in such a case. For reasonably stable predictions, the threshold value TV may be chosen to be at least 1.5. A threshold value of about 5 may be a good choice for a precise prediction. After the termination of the iteration IT, the specific neighborhood region SN and the specific training region ST that are used in the autoregressive prediction are set to the updated modified neighborhood region UMN and the updated modified training region UMT, respectively (act S8).

In cases where the last neighborhood pixel has been removed in the iteration IT of FIG. 3, another prediction scheme will be employed. However, since this case is very rare and provides that there is very little context information, a simple prediction like the mean of the available context values or a direct copy of the nearest one may be used. A superior prediction using piecewise autoregression is, however, applied for a larger number of pixels with a satisfactory prediction performance (e.g., small prediction error) compared to the state of the art (e.g., padding of pixel values).

Figure 4:
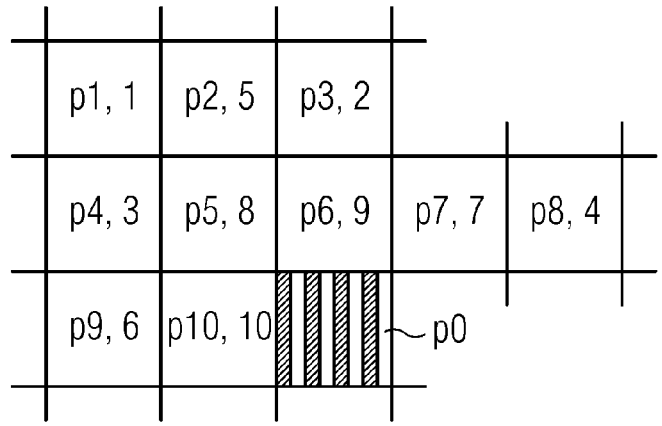
FIG. 4 shows a sequence of removal of pixels from a neighborhood region based on an embodiment.

In a corresponding iteration step of the iteration IT, more than one pixel with the largest Euclidian distance may be found. In the embodiment described herein, the following procedure will be used in order to select the pixel to be removed from the pixels with the same largest Euclidean distance: the pixel that leads to a pruned neighborhood region having a centroid with the smallest distance to the current pixel to be predicted will be removed. FIG. 4 shows an example of an order of removal of pixels based on this procedure. In FIG. 4, the neighborhood region for the current pixel p0 includes the pixels p1, p2, . . . , p10. For each pixel in the neighborhood region, a corresponding number represents the order in which the pixel is removed in subsequent iteration steps. In other words, at first, pixel p1 is removed, followed by pixel p3, pixel p4, pixel p8, pixel p2, pixel p9, pixel p7, pixel p5, pixel p6, and pixel p10.

In the foregoing, the method of one or more of the present embodiments is described based on a line-scan coding order. However, one or more of the present embodiments may also be applied to a coding method with another scan order. Examples of alternative scan orders are shown in FIG. 5 and FIG. 6. FIG. 5 corresponds to a Z-order scan ZS, and FIG. 6 corresponds to a Hilbert scan HS, where both scan orders are known from the prior art. When using another scan order as the line-scan order, reconstructed pixels with reconstructed pixel values that are located below the current pixel or at the right side of the current pixel may occur. Hence, the neighborhood region and the training region may extend to those areas.

As described above, an appropriate pruned neighborhood region and pruned training region is determined for each pixel to be predicted. In one embodiment, the process of determining the pruned regions is not performed during prediction but beforehand. The corresponding regions are in this case stored in a storage that is accessed during coding. Hence, the regions only have to be determined once and may then be used during the whole prediction process of the coding method.

The above described prediction results in predicted pixel values. For these values, a prediction error is determined based on the difference between the predicted and the original pixel value. This prediction error is optionally subjected to further lossy compression. Thereafter, the prediction error is entropy coded. In one embodiment, an efficient arithmetic coder is employed for entropy coding where the previously coded prediction errors are used to adapt a probability distribution processed in the arithmetic coder. Arithmetic coding per se is known from the prior art and uses estimated probabilities for symbols of a symbol alphabet where each symbol has a probability based on a probability distribution where the sum of all probabilities is 1. In arithmetic coding, symbols with higher probabilities use fewer bits in the code stream than symbols with lower probabilities. In the arithmetic coding described herein, the symbol alphabet consists of all possible values of prediction errors.

For the first predicted pixel value within an image or image block, there is not much information on the probability distribution from previously coded prediction errors available. Therefore, the distribution is initialized to a suitable initial distribution like to Laplacian or Gaussian distribution where a few distribution parameters like a variance estimate are computed in the encoder and then transmitted to the decoder explicitly as side information.

The present embodiments, as described above, may be used in a parallel scheme where several blocks are coded in parallel independently from each other, resulting in independent bit-streams for each block. When these blocks are not decoded sequentially, each decoding thread for a block is to know the position within the finally composed stream where the decoding of the corresponding block should start. However, the decoder may make a prediction for this position using the above described transmitted variances of each block.

The present embodiments, as described in the foregoing, may be used as a special prediction mode for each block (e.g., a macroblock in the standard H.264/AVC or a prediction unit in the draft standard HEVC). This special prediction mode indicates the usage of the intra prediction scheme for each block based on the pruned neighborhood and training regions, as described above.

Figure 7:
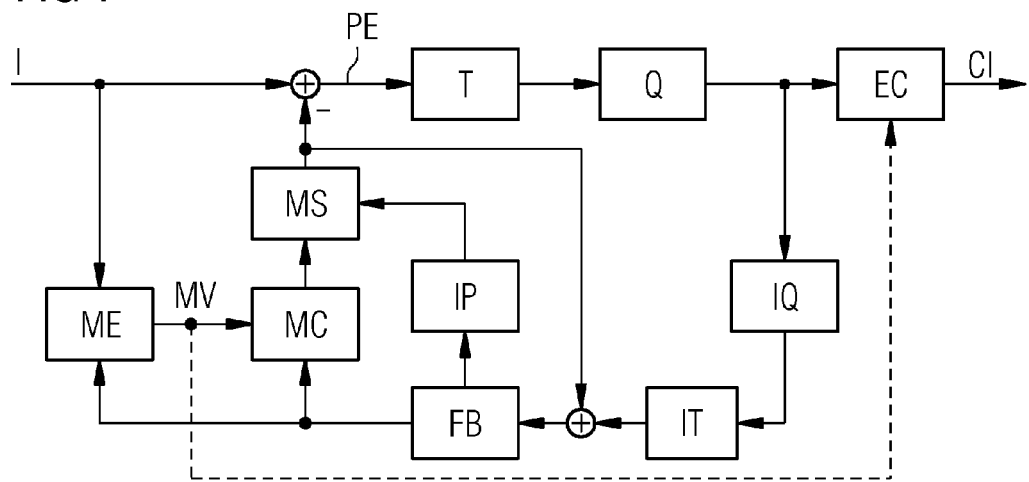
FIG. 7 is a schematic illustration of a coding method implementing an embodiment.

FIG. 7 shows a scenario in which the prediction of one or more of the present embodiments is implemented in a video coding method. In FIG. 7, a time sequence of digital images I is received by the encoder. As known from the prior art, the encoder transforms and/or quantizes the prediction error PE, as indicated by blocks T and Q. The quantized prediction error is subjected to an inverse quantization IQ and an inverse transform IT. Thereafter, the predicted pixel is reconstructed (e.g., the prediction error obtained after the inverse transform IT is added to the corresponding predicted value and stored in a frame buffer FB). For intra prediction IP, the predicted pixel value is constructed based on the already processed part of the current image (e.g., blocks or pixels) in the frame buffer FB. For inter prediction, the prediction is based on a block of a previous image subjected to motion compensation MC. Motion compensation is controlled by motion vectors MV, which are the output of a motion estimation ME. In the coding scheme of FIG. 7, a mode selection element MS that switches between the inter prediction and the intra prediction (e.g., based on rate-distortion optimization) is used. The quantized transform coefficients obtained by the quantizer Q, the motion information (e.g., the motion vectors MV), and other signaling information are entropy coded in the entropy encoder EC to produce the coded bit-stream CI.

For the parts of the image coded by the prediction according to one or more of the present embodiments, the intra prediction IP is based on a coding step where context reduction and piecewise autoregressive intra prediction based on pruned neighborhood and training regions is used, as described above. Since the method is performed pixel-wise, the transform T is usually bypassed for these blocks. For lossless coding, the quantization Q is also bypassed. In the case of intra prediction, the diagram of FIG. 7 is to be interpreted as pixel-wise processing, while for inter prediction (e.g., mainly performed by motion compensation MC), the diagram may be interpreted as a block-wise or frame-wise processing.

Figure 8:
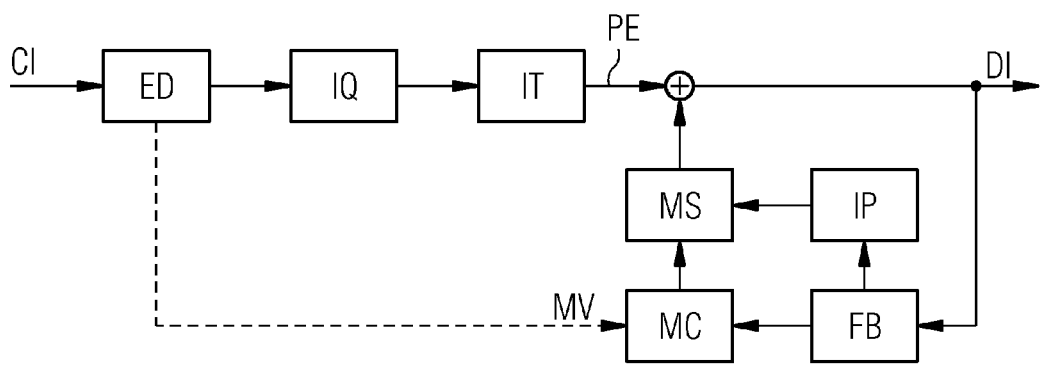
FIG. 8 is a schematic illustration of a decoding method implementing an embodiment.

As a result of the coding of FIG. 7, a coded sequence of images CI is obtained after the entropy coding EC. For decoding, the method as shown in FIG. 8 is used. According to FIG. 8, the coded sequence of images CI is at first subjected to an entropy decoding ED, an inverse quantization IQ, and/or an inverse transform IT. The resulting prediction error PE is added to the prediction value that has been intra- or inter-predicted as it is done at the encoder. The mode selection MS of the decoder may be controlled by the information contained in the bitstream. The decoding of one or more of the present embodiments is incorporated in the intra prediction element IP that performs the same operation as at encoder side. For inter prediction, motion compensation MC is performed by the transmitted motion vectors MV extracted from the coded bitstream. As is the case for the encoder, reconstructed pixel values are stored in a frame buffer FB. The information in the frame buffer is used by the intra prediction element IP and the motion compensation element MC. As a result of the decoding process shown in FIG. 8, a decoded sequence of images DI is obtained.

The autoregressive pixel-prediction, as described above, may be used independently for image arrays in the form of separate image blocks. The method, however, is not restricted to block-based applications. The arrays of images processed separately may have arbitrary shapes, which may also be adapted to the image structures. In general, the method of one or more of the present embodiments may be applied to any type of visual data such as videos, medical volumes, or dynamic volumes, multi-view data, hyperspectral data and beyond. For such applications, the neighborhood region and training region that are pruned for the prediction method may also have a multi-dimensional shape.

Apart from lossless coding, the method of one or more of the present embodiments may also be used for lossy pixel-predictive compression or even for sparse image restoration, denoising, and error concealment, where the main goal is also an estimation of unknown values from known neighborhood pixels.

The method, as described in the foregoing, has several advantages. For example, the method describes an adapted reduction method of neighborhood regions and training regions for a pixel-wise prediction in order to sustain a well-conditioned system of linear equations for calculating predicted pixel values. As a consequence of this method, better predictions and, therefore, smaller prediction errors may be achieved in regions like borders where the context information is restricted. The method of one or more of the present embodiments, for example, has advantages in block-based coding for parallel processing where a lot of border regions occur. Further, in one embodiment, additional rate may be saved by the transmission of variance information for the initialization of probability distributions used for arithmetic coding as well as by usage for predicting the code stream size.

In one embodiment, the determination of pruned neighborhood and training regions is done offline (e.g., before the prediction is performed). In this case, the pruned neighborhood and training regions for each pixel to be predicted may be stored in look-up tables or may be hardcoded in the coding software in order to prevent added computational complexity by performing the pruning method during prediction.

By using the method of one or more of the present embodiments, a parallel processing of several independent image arrays may be performed on both the encoder and decoder side. There is no communication or synchronization required between separate coding and decoding threads. Further, the amount of parallelization may be scaled arbitrarily with block size and number of images to be coded. Even thousands of threads may be provided. As the pixel positions within simultaneously coded blocks have the same neighborhood and training regions, this scheme is also suitable for a single instruction multiple data (SIMD) architecture.

The prediction errors obtained by a known prediction method using image padding may be compared to the prediction errors obtained by the method according to one or more of the present embodiments. The results may show that instable predictions in certain image areas may be improved (e.g., the prediction error in these areas may be reduced by the method).

FIG. 9 shows a schematic illustration of a codec including a coding apparatus and a decoding apparatus using a method according to one or more of the present embodiments. In the scenario of FIG. 9, a sequence of images I is fed to an encoder EN. The encoder EN includes a predictor M1 for predicting the pixel values of the pixels to be decoded in each area of a plurality of image areas by an autoregressive pixel-wise prediction. In this prediction, the predicted value of a current pixel is determined based on a weighted sum of reconstructed pixel values of reconstructed, previously processed pixels in a specific neighborhood region adjacent to the current pixel. The weights of the weighted sum are determined based on linear equations for reconstructed pixels in a specific training region adjacent to the current pixel. The encoder further includes a determiner M2 for determining the above mentioned specific neighborhood region and specific training region for the current pixel. The determiner M2 includes, for each of the above acts a) to e) described with respect to the coding, a way (e.g., a device) Ma, Mb, Mc, Md and Me to perform the respective acts a) to e).

Further, the encoder includes a processor M3, where a prediction error between predicted pixel values and the original pixel values is processed for generating the coded image data CI. This processing may include an entropy coding and optionally a transform and a quantization.

The coded image data CI obtained by the encoder EN is transmitted to a decoder DEC that includes a reconstructor M4 for reconstructing the prediction errors from the coded image data. This reconstructor M4 may include an entropy decoder and optionally an inverse transform element and an inverse quantization element. Further, the decoder DEC includes a predictor M5 that works analogously to the predictor M1 in the encoder EN. In other words, the predictor predicts the pixel values of the pixels to be decoded in each of a plurality of arrays of pixels by an autoregressive pixel-wise prediction. The decoding apparatus DEC includes a determiner M6 for determining the specific neighborhood region and the specific training region used in the predictor M5. The determiner M6 includes, for each of the above described decoding acts a) to e), a way (e.g., a device) Ma', Mb', Mc', Md' and Me' to perform the corresponding one of the acts a) to e). Further, the decoder DEC includes a corrector M7 for correcting the predicted pixel values obtained by the predictor M5 by the reconstructed prediction error obtained by the reconstructor M4. As a result, a decoded sequence DI of images that corresponds to the original sequences of images I in case of a lossless coding and decoding is obtained.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for coding digital image data, the digital image data comprising one or more arrays of pixels with corresponding pixel values, the method comprising:
    predicting the pixel values of the pixels to be coded in each array by a prediction in which a predicted value of a current pixel is determined based on a weighted sum of reconstructed pixel values of reconstructed, previously processed pixels in a specific neighborhood region adjacent to the current pixel;
    determining weights of the weighted sum based on linear, non-linear, or linear and non-linear equations for reconstructed pixels in a specific training region adjacent to the current pixel; and
    processing, by a processor, a prediction error between predicted pixel values and original pixel values for generating coded image data,
    wherein determining the specific neighborhood region and the specific training region for the current pixel comprises:
        determining pixels in a preset neighborhood region adjacent to the current pixel for which reconstructed pixel values exist, resulting in a modified neighborhood region defined by the determined pixels;
        determining pixels in a preset training region adjacent to the current pixel for which reconstructed pixel values exist and for which the modified neighborhood region exclusively includes pixels for which reconstructed pixel values exist, resulting in a modified training region defined by the determined pixels;
        determining a validation value dependent on a parameter that increases in dependency on an increasing number of pixels in the modified training region and that increases in dependency on a decreasing number of pixels in the modified neighborhood region;
        performing an iteration when the validation value corresponds to a parameter less than or equal to a predetermined threshold value, and otherwise, the specific neighborhood region corresponds to the modified neighborhood region, and the specific training region corresponds to the modified training region;
        when the iteration is performed, removing, in each iteration, at least one additional pixel from the modified neighborhood region, resulting in an updated modified neighborhood region in each iteration, wherein the iteration terminates when the validation value determined in the corresponding iteration based on the number of pixels in the updated modified neighborhood region corresponds to a parameter exceeding or reaching the predetermined threshold value, the specific neighborhood region being the updated modified neighborhood region at the termination of the iteration and the specific training region being a region exclusively comprising pixels of the preset training region for which reconstructed pixel values exist and for which the updated modified neighborhood region at the termination of the iteration exclusively includes pixels for which reconstructed pixel values exist.

2. The method of claim 1, wherein the parameter is a ratio between the number of pixels in the modified training region and the number of pixels in the modified neighborhood region, the validation value being the parameter.

3. The method of claim 1, wherein removing the at least one additional pixel comprises determining an updated modified training region in each iteration, the updated modified training region being a region exclusively comprising all pixels of the preset training region for which reconstructed pixel values exist and for which the updated modified neighborhood region exclusively includes pixels for which reconstructed pixel values exist.

4. The method of claim 3, wherein the specific training region determined in the removing of the at least one additional pixel is the updated modified training region, the validation value in the removing of the at least one additional pixel is determined based on both the number of pixels in the updated modified neighborhood region and the number of pixels in the updated modified training region, or a combination thereof.

5. The method of claim 3, wherein the at least one pixel being removed in each iteration is a pixel that results in an updated modified neighborhood region leading to an updated modified training region with the most pixels.

6. The method of claim 1, wherein a Euclidean distance is defined in each array of pixels, and
    wherein the at least one pixel being removed in each iteration is a pixel with the largest Euclidean distance to the current pixel.

7. The method of claim 6, wherein when there are a plurality of pixels, the removal of which leads to an updated modified training region with the most pixels, a plurality of pixels with the largest Euclidean distance, or a combination thereof, the pixel is removed resulting in an updated modified neighborhood region having a centroid with a smallest distance to the current pixel.

8. The method of claim 1, wherein another type of prediction is used for specific current pixels based on one or more criteria, the one or more criteria comprising the iteration not finding an updated modified neighborhood region leading to a validation value corresponding to a parameter that exceeds or reaches the predetermined threshold value.

9. The method of claim 1, wherein the pixels of the digital image data are coded in a coding order based on a line-scan, a Z-order scan, a Hilbert scan, or any combination thereof.

10. The method of claim 1, wherein the prediction error is subjected to an entropy coding.

11. The method of claim 10, wherein the entropy coding for each array of pixels is an adaptive arithmetic coding or an adaptive variable length coding that starts with an initial probability distribution having one or more distribution parameters and a variance, the one or more distribution parameters being included as a side information in the coded image data.

12. The method of claim 11, wherein a plurality of arrays of pixels or all arrays of pixels of the one or more arrays of pixels are coded simultaneously.

13. The method of claim 1, wherein the determining of the pixels in the preset neighborhood region adjacent to the current pixel, the determining of the pixels in the preset training region adjacent to the current pixel, the determining of the validation value, and the performing of the iteration are performed before predicting the pixel values, and wherein the specific neighborhood regions and specific training regions for the pixels are prestored in a storage that is accessed during the prediction of the pixel values.

14. The method of claim 1, wherein the method is a video coding method that codes a sequence of digital images, and wherein each array of pixels of the one or more arrays of pixels refers to blocks in the sequence.

15. The method of claim 14, wherein the video coding is based on the standard H.264/AVC or HEVC.

16. The method of claim 1, wherein the image data comprises one or more images having three or more dimensions.

17. A method for decoding digital image data that is coded, the method comprising:

reconstructing prediction errors from the coded digital image data, the coded digital image data comprising one or more arrays of pixels with corresponding pixel values;

predicting pixel values of the pixels to be decoded in each array by a prediction in which a predicted value of a current pixel is determined based on a weighted sum of reconstructed pixel values of reconstructed, previously decoded pixels in a specific neighborhood region adjacent to the current pixel;

determining weights of the weighted sum based on linear, non-linear, or linear and non-linear equations for reconstructed pixels in a specific training region adjacent to the current pixel; and correcting the predicted pixel value by a reconstructed prediction error, resulting in a decoded pixel value for the current pixel, wherein the specific neighborhood region and the specific training region for the current pixel are determined as follows:

determining pixels in a preset neighborhood region adjacent to the current pixel for which reconstructed pixel values exist, resulting in a modified neighborhood region defined by the determined pixels;

determining pixels in a preset training region adjacent to the current pixel for which reconstructed pixel values exist and for which the modified neighborhood region exclusively includes pixels for which reconstructed pixel values exist, resulting in a modified training region defined by the determined pixels;

determining a validation value being dependent on a parameter that increases in dependency on an increasing number of pixels in the modified training region and increases in dependency on a decreasing number of pixels in the modified neighborhood region;

performing an iteration when the validation value corresponds to a parameter less than or less than or equal to a predetermined threshold value, wherein otherwise the specific neighborhood region corresponds to the modified neighborhood region, and the specific training region corresponds to the modified training region;

removing, when the iteration is performed, at least one additional pixel in each iteration from the modified neighborhood region, resulting in an updated modified neighborhood region in each iteration, wherein the iteration terminates when the validation value determined in the corresponding iteration based on the number of pixels in the updated modified neighborhood region corresponds to a parameter exceeding or reaching the predetermined threshold value, the specific neighborhood region being the updated modified neighborhood region at the termination of the iteration and the specific training region being a region exclusively comprising pixels of the preset training region for which reconstructed pixel values exist and for which the updated modified neighborhood region at the termination of the iteration exclusively includes pixels for which reconstructed pixel values exist.

18. The method of claim 17, wherein the digital image data, which is coded by a method, is decoded, the method comprising subjecting the prediction error to an entropy coding, wherein the entropy coding for each array of pixels is an adaptive arithmetic coding or an adaptive variable length coding that starts with an initial probability distribution having one or more distribution parameters and a variance, the one or more distribution parameters being included as a side information in the coded image data, and wherein the one or more distribution parameters of the probability distribution is used for determining the start of a corresponding array of pixels.

19. A method for coding and decoding digital image data, the method comprising:

coding the digital image data, the digital image data comprising one or more arrays of pixels with corresponding pixel values, the coding comprising:

predicting the pixel values of the pixels to be coded in each array by a prediction in which the predicted value of a current pixel is determined based on a weighted sum of reconstructed pixel values of reconstructed, previously processed pixels in a specific neighborhood region adjacent to the current pixel;

determining weights of the weighted sum based on linear, non-linear, or linear and non-linear equations for reconstructed pixels in a specific training region adjacent to the current pixel; and processing a prediction error between predicted pixel values and original pixel values for generating coded image data, wherein determining the specific neighborhood region and the specific training region for the current pixel comprises:

determining pixels in a preset neighborhood region adjacent to the current pixel for which reconstructed pixel values exist, resulting in a modified neighborhood region defined by the determined pixels;

determining pixels in a preset training region adjacent to the current pixel for which reconstructed pixel values exist and for which the modified neighborhood region exclusively includes pixels for which reconstructed pixel values exist, resulting in a modified training region defined by the determined pixels;

determining a validation value dependent on a parameter that increases in dependency on an increasing number of pixels in the modified training region and that increases in dependency on a decreasing number of pixels in the modified neighborhood region;

performing an iteration when the validation value corresponds to a parameter less than or equal to a predetermined threshold value, and otherwise, the specific neighborhood region corresponds to the modified neighborhood region, and the specific training region corresponds to the modified training region;

when the iteration is performed, removing, in each iteration, at least one additional pixel from the modified neighborhood region, resulting in an updated modified neighborhood region in each iteration, wherein the iteration terminates when the validation value determined in the corresponding iteration based on the number of pixels in the updated modified neighborhood region corresponds to a parameter exceeding or reaching the predetermined threshold value, the specific neighborhood region being the updated modified neighborhood region at the termination of the iteration and the specific training region being a region exclusively comprising pixels of the preset training region for which reconstructed pixel values exist and for which the updated modified neighborhood region at the termination of the iteration exclusively includes pixels for which reconstructed pixel values exist; and decoding the coded digital image data, the decoding comprising:
reconstructing the prediction errors from the coded digital image data;
predicting the pixel values of the pixels to be decoded in each array by a prediction in which the predicted value of the current pixel is determined based on the weighted sum of reconstructed pixel values of reconstructed, previously decoded pixels in the specific neighborhood region adjacent to the current pixel;
determining the weights of the weighted sum based on linear, non-linear, or linear and non-linear equations for reconstructed pixels in the specific training region adjacent to the current pixel; and
correcting the predicted pixel value by the reconstructed prediction error, resulting in a decoded pixel value for the current pixel.

20. An apparatus for coding digital image data, the digital image data comprising one or more arrays of pixels with corresponding pixel values, the apparatus comprising:
a predictor configured to:
predict the pixel values of the pixels to be coded in each array by a prediction in which the predicted value of a current pixel is determined based on a weighted sum of reconstructed pixel values of reconstructed, previously processed pixels in a specific neighborhood region adjacent to the current pixel; and
determine weights of the weighted sum based on linear, non-linear, or linear and non-linear equations for reconstructed pixels in a specific training region adjacent to the current pixel; and a processor configured to:
process a prediction error between predicted pixel values and original pixel values for generating the coded image data;
determine the specific neighborhood region and the specific training region for the current pixel, the determination of the specific neighborhood region and the specific training region comprising:
determination of the pixels in a preset neighborhood region adjacent to the current pixel for which reconstructed pixel values exist, resulting in a modified neighborhood region defined by the determined pixels;
determination of pixels in a preset training region adjacent to the current pixel for which reconstructed pixel values exist and for which the modified neighborhood region exclusively includes pixels for which reconstructed pixel values exist, resulting in a modified training region defined by the determined pixels;
determination of a validation value being dependent on a parameter that increases in dependency on an increasing number of pixels in the modified training region and increases in dependency on a decreasing number of pixels in the modified neighborhood region;
performance of an iteration when the validation value corresponds to a parameter less than or less than or equal to a predetermined threshold value, and otherwise, the specific neighborhood region corresponds to the modified neighborhood region, and the specific training region corresponds to the modified training region;
removal, when the iteration is performed, of at least one additional pixel in each iteration from the modified neighborhood region, resulting in an updated modified neighborhood region in each iteration, wherein the iteration terminates when the validation value determined in the corresponding iteration based on the number of pixels in the updated modified neighborhood region corresponds to a parameter exceeding or reaching the predetermined threshold value, the specific neighborhood region being the updated modified neighborhood region at the termination of the iteration and the specific training region being a region exclusively comprising pixels of the preset training region for which reconstructed pixel values exist and for which the updated modified neighborhood region at the termination of the iteration exclusively includes pixels for which reconstructed pixel values exist.

21. The apparatus of claim 20, wherein the parameter is a ratio between the number of pixels in the modified training region and the number of pixels in the modified neighborhood region, the validation value being the parameter.

22. An apparatus for decoding digital image data that is coded, the apparatus comprising:
a processor configured to:
reconstruct prediction errors from the coded digital image data, the digital image data comprising one or more arrays of pixels with corresponding pixel values;
predict pixel values of pixels to be decoded in each array of the one or more arrays of pixels by a prediction in which the predicted value of a current pixel is determined based on a weighted sum of reconstructed pixel values of reconstructed, previously decoded pixels in a specific neighborhood region adjacent to the current pixel, wherein weights of the weighted sum are determined based on linear, non-linear, or linear and non-linear equations for reconstructed pixels in a specific training region adjacent to the current pixel;

correct the predicted pixel value by the reconstructed prediction error, resulting in a decoded pixel value for the current pixel; and determine the specific neighborhood region and the specific training region for the current pixel, the determination of the specific neighborhood region and the specific training region comprising:

determination of pixels in a preset neighborhood region adjacent to the current pixel for which reconstructed pixel values exist, resulting in a modified neighborhood region defined by the determined pixels;

determination of pixels in a preset training region adjacent to the current pixel for which reconstructed pixel values exist and for which the modified neighborhood region exclusively includes pixels for which reconstructed pixel values exist, resulting in a modified training region defined by the determined pixels;

determination of a validation value dependent on a parameter that increases in dependency on an increasing number of pixels in the modified training region and increases in dependency on a decreasing number of pixels in the modified neighborhood region;

performance of an iteration when the validation value corresponds to a parameter less than or less than or equal to a predetermined threshold value, otherwise the specific neighborhood region corresponding to the modified neighborhood region and the specific training region corresponding to the modified training region;

when the iteration is performed, removal of at least one additional pixel in each iteration step from the modified neighborhood region, resulting in an updated modified neighborhood region in each iteration step, wherein the iteration terminates when the validation value determined in the corresponding iteration step based on the number of pixels in the updated modified neighborhood region corresponds to a parameter exceeding or reaching the predetermined threshold value, the specific neighborhood region being the updated modified neighborhood region at the termination of the iteration and the specific training region being a region exclusively comprising pixels of the preset training region for which reconstructed pixel values exist and for which the updated modified neighborhood region at the termination of the iteration exclusively includes pixels for which reconstructed pixel values exist.

23. A codec for coding and decoding digital image data, the codec comprising:

a coding apparatus for coding digital image data, the digital image data comprising one or more arrays of pixels with corresponding pixel values, the coding apparatus comprising:

a predictor configured to:

predict the pixel values of the pixels to be coded in each array by a prediction in which the predicted value of a current pixel is determined based on a weighted sum of reconstructed pixel values of reconstructed, previously processed pixels in a specific neighborhood region adjacent to the current pixel; and determine weights of the weighted sum based on linear, non-linear, or linear and non-linear equations for reconstructed pixels in a specific training region adjacent to the current pixel; and a processor configured to:

process a prediction error between predicted pixel values and original pixel values for generating the coded image data;

determine the specific neighborhood region and the specific training region for the current pixel, the determination of the specific neighborhood region and the specific training region comprising:

determination of the pixels in a preset neighborhood region adjacent to the current pixel for which reconstructed pixel values exist, resulting in a modified neighborhood region defined by the determined pixels;

determination of pixels in a preset training region adjacent to the current pixel for which reconstructed pixel values exist and for which the modified neighborhood region exclusively includes pixels for which reconstructed pixel values exist, resulting in a modified training region defined by the determined pixels;

determination of a validation value being dependent on a parameter that increases in dependency on an increasing number of pixels in the modified training region and increases in dependency on a decreasing number of pixels in the modified neighborhood region;

performance of an iteration when the validation value corresponds to a parameter less than or less than or equal to a predetermined threshold value, and otherwise, the specific neighborhood region corresponds to the modified neighborhood region, and the specific training region corresponds to the modified training region;

removal, when the iteration is performed, of at least one additional pixel in each iteration from the modified neighborhood region, resulting in an updated modified neighborhood region in each iteration, wherein the iteration terminates when the validation value determined in the corresponding iteration based on the number of pixels in the updated modified neighborhood region corresponds to a parameter exceeding or reaching the predetermined threshold value, the specific neighborhood region being the updated modified neighborhood region at the termination of the iteration and the specific training region being a region exclusively comprising pixels of the preset training region for which reconstructed pixel values exist and for which the updated modified neighborhood region at the termination of the iteration exclusively includes pixels for which reconstructed pixel values exist; and a decoding apparatus for decoding digital image data that is coded, the decoding apparatus comprising:

the processor configured to:

reconstruct prediction errors from the coded digital image data, the digital image data comprising one or more arrays of pixels with corresponding pixel values;

predict pixel values of pixels to be decoded in each array of the one or more arrays of pixels by a prediction in which the predicted value of a current pixel is determined based on a weighted sum of reconstructed pixel values of reconstructed, previously decoded pixels in a specific neighborhood region adjacent to the current pixel, wherein weights of the weighted sum are determined based on linear, non-linear, or linear and non-linear equations for reconstructed pixels in a specific training region adjacent to the current pixel;

correct the predicted pixel value by the reconstructed prediction error, resulting in a decoded pixel value for the current pixel; and determine the specific neighborhood region and the specific training region for the current pixel, the determination of the specific neighborhood region and the specific training region comprising:

determination of pixels in a preset neighborhood region adjacent to the current pixel for which reconstructed pixel values exist, resulting in a modified neighborhood region defined by the determined pixels;

determination of pixels in a preset training region adjacent to the current pixel for which reconstructed pixel values exist and for which the modified neighborhood region exclusively includes pixels for which reconstructed pixel values exist, resulting in a modified training region defined by the determined pixels;

determination of a validation value dependent on a parameter that increases in dependency on an increasing number of pixels in the modified training region and increases in dependency on a decreasing number of pixels in the modified neighborhood region;

performance of an iteration when the validation value corresponds to a parameter less than or less than or equal to a predetermined threshold value, otherwise the specific neighborhood region corresponding to the modified neighborhood region and the specific training region corresponding to the modified training region;

when the iteration is performed, removal of at least one additional pixel in each iteration step from the modified neighborhood region, resulting in an updated modified neighborhood region in each iteration step, wherein the iteration terminates when the validation value determined in the corresponding iteration step based on the number of pixels in the updated modified neighborhood region corresponds to a parameter exceeding or reaching the predetermined threshold value, the specific neighborhood region being the updated modified neighborhood region at the termination of the iteration and the specific training region being a region exclusively comprising pixels of the preset training region for which reconstructed pixel values exist and for which the updated modified neighborhood region at the termination of the iteration exclusively includes pixels for which reconstructed pixel values exist.

* * * * *